UNITED STATES PATENT OFFICE.

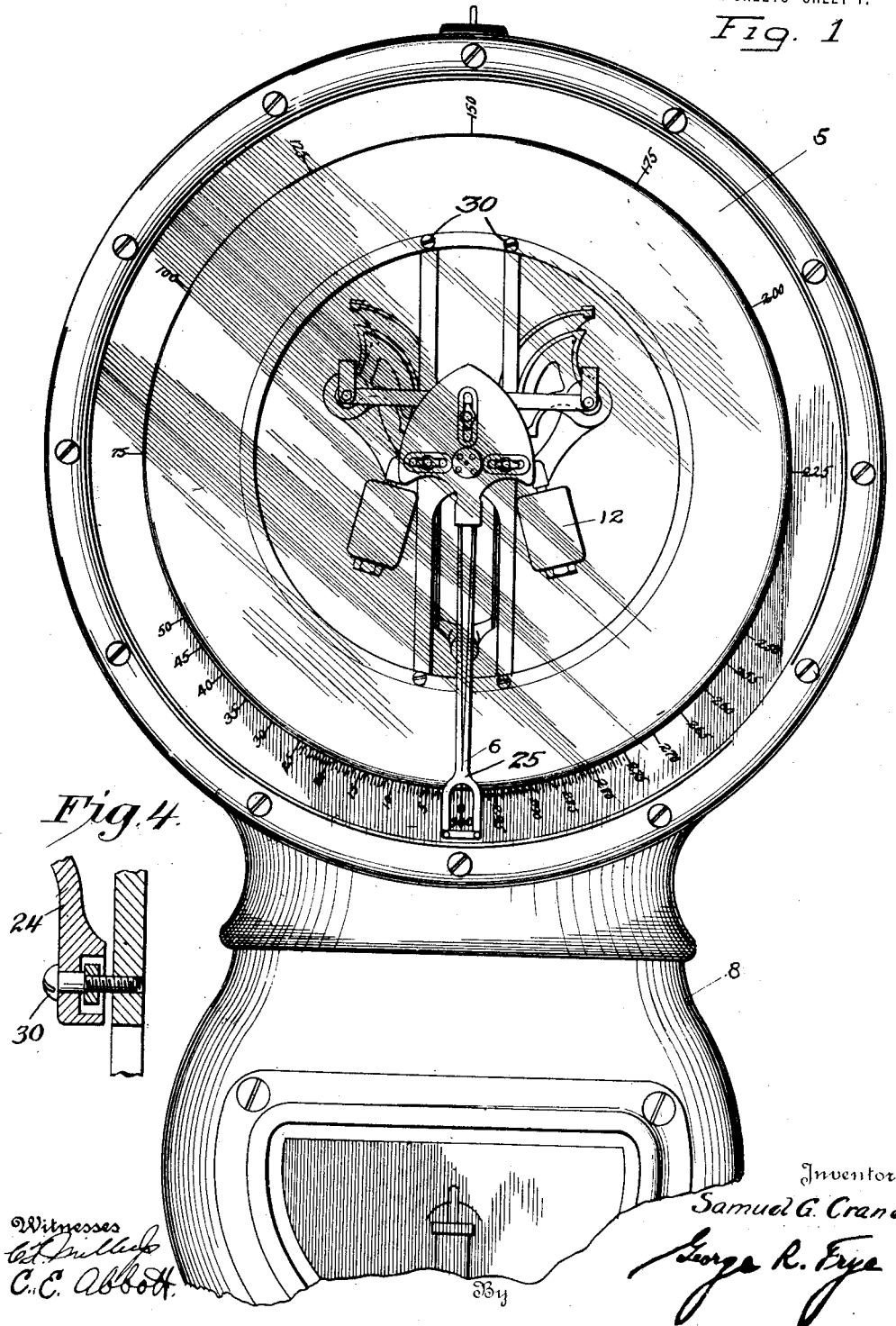

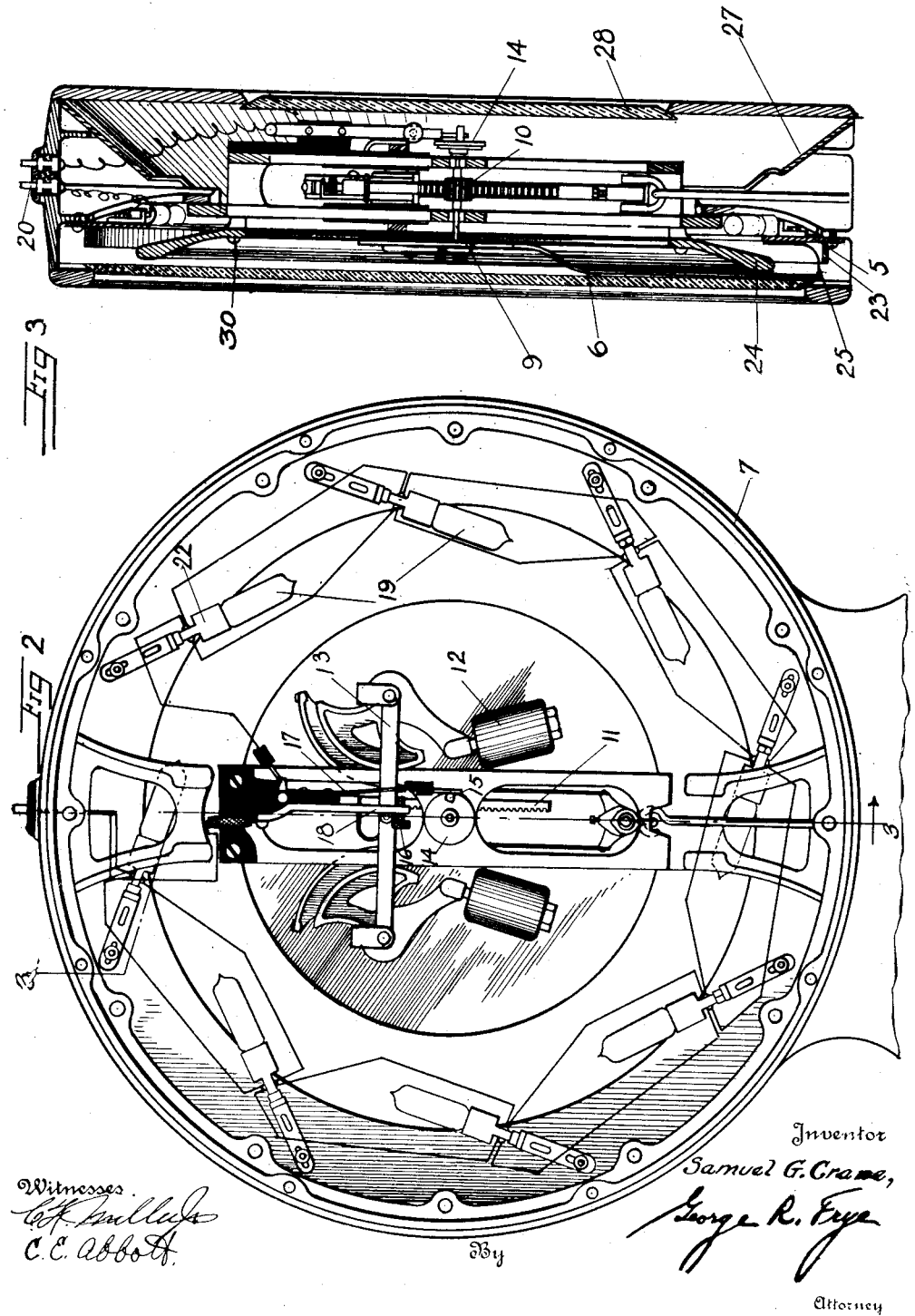

SAMUEL G. CRANE, OF TOLEDO, OHIO, ASSIGNOR TO TOLEDO SCALE COMPANY, OF TOLEDO, OHIO, A CORPORATION OF NEW JERSEY.

ILLUMINATED WEIGHING-SCALE.

1,356,602.  Specification of Letters Patent.  Patented Oct. 26, 1920.

Application filed August 22, 1917. Serial No. 187,600.

*To all whom it may concern:*

Be it known that I, SAMUEL G. CRANE, a citizen of the United States, residing at Toledo, in the county of Lucas and State of Ohio, have invented certain new and useful Improvements in Illuminated Weighing-Scales, of which the following is a specification.

This invention relates to improvements in weighing scale structures, and more particularly to scales of this type which are provided with self-contained artificial lighting means to illuminate the reading portions of the scale.

Automatic scales are gradually supplanting the old-fashioned beam scales and yet attempt is being made to utilize the automatic scales in dark warehouses and shipping rooms wherein had been installed the earlier scales which did not have reading dials. It has therefore been necessary to provide some means for illuminating the dial at the time of reading, both to enable the operator to read the scale with the same celerity with which the weighing was performed and to prevent accidental errors in reading. The difficulties of constructing a simple and efficient scale with effective lighting facilities are numerous and various attempts to illuminate dial scales for the same purpose have not proved entirely satisfactory. Thus in many of the scales hitherto constructed the heat of the lights employed has been instrumental in warping or otherwise interfering with the proper adjustment of the indicating chart and associated portions of the scale mechanism, and when attempt is made to remove the lights a sufficient distance from the readily warped parts to partially avoid the overheating thereof the rays of the light were not properly distributed over the chart itself. Also, if the lamps are so placed as to directly throw their rays upon the reading chart, the result is a number of light spots on the chart, between which are a similar number of dark spots, owing to the uneven radiation of the illumination.

The primary object of this invention is to overcome the difficulties enumerated and provide a simple, compact and efficient means for illuminating the scale dial at the time the weighing operation is performed, while providing an even method of distributing the illumination indirectly upon the chart. Another object is to place the lamps out of the line of view of the operator but in position to be readily adjusted whenever necessary. A further object is to provide an illuminating means that can be attached to a weighing scale without requiring extensive changes therein, so that the installations can, if desired, be made directly in the field.

With the above and other objects in view which will more readily appear as the invention is better understood, my invention consists in the novel construction and arrangement of parts to be hereinafter more fully described and particularly pointed out in the appended claims.

Reference is to be had to the accompanying drawings illustrating a preferred embodiment of my invention, and wherein similar reference numerals designate similar parts throughout the several views.

In the drawings:—

Figure 1 is a front elevation of the reading portion of a scale equipped with my invention;

Fig. 2 is a transverse section showing the arrangement of the illuminating lamps; and Fig. 3 is a central vertical section through the dial and associated portions.

Fig. 4 is a fragmentary view showing a reflector adjusting device.

Referring to the drawings, the numeral 5 designates the dial of the scale, upon which are marked the weight indications or graduations, and 6 designates the indicator hand or pointer which coöperates with the weight indications upon the dial 5 so as to indicate the weight of any commodity weighed upon the scale. The dial 5 is suitably supported in position within the housing 7 of the scale, which housing is preferably mounted upon the upper end of a column 8, the lower end of which rests upon the platform (not shown) of the scale. The indicator hand is preferably mounted adjacent the end of the indicator shaft, which is mounted centrally of the dial and carries a pinion 10 adapted to mesh with a vertically disposed reciprocating rack 11 suitably connected with the weighing mechanism of the scale so as to rotate the pinion an angular distance proportionally to the displacement of the load-offsetting mechanism.

It is to be understood that the weighing mechanism of the scale may be of any approved type, and that the means of actuating the rack over the weighing mechanism may be of any desired form, various weighing mechanisms well known in the scale art being fully capable of performing the required functions. The embodiment herein illustrated is one that has been found to successfully demonstrate the capabilities of the invention, and shows a pendulum scale of a well-known type adapted to vertically reciprocate the rack upon the displacement of the pendulum mechanism, the rack meshing with the pinion operating the indicator hand, and suitable connecting means being interposed between the platform supporting levers and the pendulum load-offsetting mechanism to swing the pendulums 12 upwardly upon the placing of a load upon the scale platform. Inasmuch as the present invention is not dependent upon any particular form of scale mechanism, no attempt is made in this application to show a complete scale mechanism nor to delineate the action of the scale in its load-offsetting or weighing operations; only so much of the scale mechanism being shown as is necessary to portray the position and operation of the indicating portions of the scale at the time they are illuminated through my improved illuminating means.

In the embodiment herein illustrated, the oppositely-disposed pendulums 12 are connected by crossbars 13, which crossbars are moved vertically upward as the pendulums are displaced outwardly, and are again lowered as the pendulums return to their normal positions. The rack 11 may be, therefore, conveniently attached to these crossbars 13 and is preferably so arranged. Each of the pendulums 12 comprises a weighted arm and supporting and operating segments which are arranged substantially as shown in the patent to Hapgood, No. 1,203,611, issued November 7, 1916. Fixed on the indicator shaft 9 adjacent its rear extremity is a disk 14 having a pin 15 arranged to contact the suspended switch arm 17 of the illuminating means. The normal position of the pin and pendent switch arm is shown in Fig. 2 of the drawings, and when the indicator shaft 9 is rotated through the movement of the rack and pinion the pin 15 will be moved away from the pendent switch arm and permit said arm to swing into contact with the stationary switch arm 18, thus completing a circuit to energize the illuminating lamps. It will thus be understood that as long as the scale is not being used the circuit is open and the lamps extinguished, but instantly upon the movement of the indicating means through the weighing mechanism the circuit is completed and the lights automatically illuminated, and remain so until the load is removed from the scale platform to permit the pendulums to return to their normal positions.

The wiring system within the scale for connecting the electric lamps 19 with the batteries or other source of current is shown in Figs. 2 and 3, and comprises a wire leading from the pendent spring arm 17 of the switch to the several lamps which may be connected in any manner, as, for example, in series or multiple, and thence is connected with one terminal of the connecting post 20 through which connection may be made to the city circuit, a series of dry cells, or any other desired source of current. The other post may be directly connected with the stationary switch arm 18, which arm carries an adjustable post 16 so arranged that contact with the pendent switch arm 17 can be as early or as late in the weighing operation as desired. A portable service plug of any approved construction may be used to bridge the posts of the connecting plug 20. Each of the electric lamps 19 are preferably mounted in sockets 22 arranged to be adjusted toward or from the center of the dial 5, any desired adjusting means, such as elongated slots and set screws, being employed. These lamps project slightly within the inner portion of the chart 5, which chart, as can be seen in Fig. 3, is preferably formed as a narrow ring and with a flange 23 arranged at right angles to that portion of the chart bearing the indicating numerals. This flange may be made separate from the dial itself and acts as a reflector as hereinafter described. Arranged within and in front of the chart 5 is a reflector 24 preferably formed as a substantially conical ring with its rear surface shaped and arranged to reflect the light from the lamps 19 onto the indicating chart. This rear surface may, if desired, be curved to direct the luminous rays more evenly upon the indicating chart and may be coated with aluminum paint or other bright substances. Provision is made for securing the reflector substantially concentrically of the chart 5 by elongated screws or bolts 30 tapped into the framework of the scale, whereby the reflector may be positioned at any desired position in advance of the chart to properly distribute the light. The indicator hand, as is apparent from Fig. 3, is shaped so as to clear the conical reflector 24 at all times and carries a rearwardly projecting reading wire 25 adapted to extend into close proximity with the graduations on the dial 5.

In operation, when the scale is installed, a service plug is arranged across the terminals of the connecting post 20 connecting the source of current with the illuminating means. Whenever a load is being weighed the pendulums swing outwardly, lifting the rack 11, which through the pinion 10 rotates the indicator hand 6 to show the weight of the commodity on the scale platform, and also rotates the disk 14 to swing the pin 15 away from the pendent switch arm 17, thus permitting the pendent arm to swing into contact with the stationary switch post 16 and complete the circuit to energize the illuminating lamps 19. When illuminated, these lamps project their luminous rays against the rear inclined surface of the reflector 24 and these are reflected to the graduated portion of the chart, causing an even distribution of indirect light. As soon as the commodity is removed from the scale platform the pendulums fall to their original positions, returning the indicator hand to zero and the pin 15 into contact with the pendent arm 17, forcing the said arm away from the stationary post 16 and breaking the circuit.

It will be apparent that the reflector 24 effectively covers the illuminating lamps and prevents their rays coming into direct contact with the eyes of the operator, and at the same time breaks up and distributes the luminous rays so as to avoid the alternate light and dark spots of direct illumination. Also if, as shown in Fig. 3, the rear portion of the scale is provided with a transparent portion, means may be provided for preventing the rays of the lamps directly projecting through such window. In the illustrated embodiment a substantially conical shield 27 is arranged adjacent the rear portion of the dial casing so as to protect the window 28 from the direct rays of the lamps.

From the above it will be seen that the illustrated embodiment of my invention provides a means well calculated to adequately fulfil the objects primarily stated. The construction is, however, susceptible of modification without departing from the spirit and scope of the invention as set forth in the following claims.

Having described my invention, I claim:

1. The combination in a weighing scale having a chart, of means adapted to indicate weights in conjunction with the chart, a reflector arranged in advance of the chart and with its outer surface overlapping a portion of the chart, and illuminating means arranged in the rear of the chart and reflector in position to project their luminous rays indirectly upon the forward face of the chart and adapted to be so adjusted that no direct rays are projected between the adjacent edges of the chart and reflector.

2. The combination in a weighing scale having a chart, of means adapted to indicate weights in conjunction with the chart, a reflector arranged centrally and in advance of the chart and having its outer edge portion overlapping the inner portion of the chart, and illuminating means arranged in the rear of the reflector and the chart in position to project their luminous rays indirectly upon the forward face of the chart and adapted to be so adjusted that no direct rays are projected between the adjacent edges of the chart and reflector.

3. The combination in a weighing scale having a chart, of means adapted to indicate weights in conjunction with the chart, a reflector arranged in advance of the chart and with its outer surface overlapping a portion of the chart, a series of electric lamps arranged in spaced relation in rear of the reflector and chart in position to project their luminous rays indirectly upon the chart and adapted to be so adjusted that no direct rays are projected between the adjacent edges of the chart and reflector, and means for illuminating said lamps when the scale is in operation.

4. The combination in a weighing scale having a chart, of means for indirectly illuminating said chart when the scale is in operation, comprising a reflector arranged in advance of and substantially concentrically with the chart, a series of electric lamps arranged annularly in the rear of the reflector and chart in position to project their luminous rays indirectly upon the chart and adapted to be so adjusted that no direct rays are projected between the adjacent edges of the chart and reflector, and means for illuminating the lamps when the scale is operated.

5. The combination in a weighing scale having an annular chart, of means for indirectly illuminating said chart when the scale is in operation, comprising a reflector arranged in advance of and substantially concentrically with the chart and having its outer periphery overlapping the inner portion of the chart, a series of electric lamps arranged annularly in the rear of the reflector and chart and adapted to be so adjusted that no direct rays are projected between the adjacent edges of the chart and reflector in position to project their luminous rays indirectly upon the chart, and means for illuminating the lamps when the scale is operated.

6. The combination in a weighing scale having a chart, of means for indirectly illuminating said chart when the scale is in operation, comprising a reflector arranged in advance of and substantially concentrically with the chart, the rear surface of the reflector being inclined from its central portion to its periphery and at its outer periphery overlapping a portion of the chart, a series of electric lamps arranged annularly in the rear of the reflector and chart and adapted to be so adjusted that no direct rays are projected between the adjacent edges of the chart and reflector in position to project their luminous rays indirectly upon the chart, and means for illuminating the lamps when the scale is operated.

7. The combination in a weighing scale having a chart, of means for indirectly illuminating the chart during the weighing operation, comprising a reflector arranged in advance of the chart and adapted to be adjustably positioned toward or from the chart to variably diffuse the luminous rays cast thereon, and a series of electric lamps arranged in rear of the reflector and chart to project their luminous rays upon the reflector and thence upon the chart, said lamps being adjustable to positions in which no direct rays are projected between the adjacent edges of the reflector and chart.

8. The combination in a weighing scale having an annular chart, of means for indirectly illuminating the chart during the weighing operation, comprising an annular inclined reflector arranged in advance of the chart and adapted to be adjustably positioned toward or from the chart to variably diffuse the luminous rays cast thereon, and an annular series of electric lamps arranged in rear of the reflector and chart to project their luminous rays upon the reflector and thence upon the chart.

9. The combination in a weighing scale having a chart, of means for indirectly illuminating the chart during the weighing operation, comprising a reflector arranged in advance of the chart and adapted to be adjustably positioned toward or from the chart to variably diffuse the luminous rays cast thereon, a series of electric lamps arranged in rear of the reflector and chart to project their luminous rays upon the reflector and thence upon the chart, said lamps being adjustable to positions in which no direct rays are projected between the adjacent edges of the reflector and chart, and a reflecting ring arranged at right angles to the chart beyond the indicating portion thereof.

SAMUEL G. CRANE.

Witnesses:
C. H. HAPGOOD,
F. A. CROWLEY.